United States Patent
Gangadharappa et al.

(10) Patent No.: US 9,654,507 B2
(45) Date of Patent: May 16, 2017

(54) CLOUD APPLICATION CONTROL USING MAN-IN-THE-MIDDLE IDENTITY BROKERAGE

(71) Applicants: Tejus Gangadharappa, Santa Clara, CA (US); Sivaprasad Udupa, San Jose, CA (US); Dhawal Sharma, Jammu (IN); Sridhar Narasimhan, Bangalore (IN); Manoj Apte, San Jose, CA (US)

(72) Inventors: Tejus Gangadharappa, Santa Clara, CA (US); Sivaprasad Udupa, San Jose, CA (US); Dhawal Sharma, Jammu (IN); Sridhar Narasimhan, Bangalore (IN); Manoj Apte, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 0 days.

(21) Appl. No.: 14/448,012

(22) Filed: Jul. 31, 2014

(65) Prior Publication Data

US 2016/0036855 A1 Feb. 4, 2016

(51) Int. Cl.
*H04L 29/06* (2006.01)
*H04L 29/08* (2006.01)

(52) U.S. Cl.
CPC ............ *H04L 63/20* (2013.01); *H04L 63/083* (2013.01); *H04L 67/146* (2013.01); *H04L 67/2809* (2013.01)

(58) Field of Classification Search
CPC ... H04L 63/20; H04L 63/102; H04L 63/0227; H04L 63/083; H04L 67/146; H04L 67/2809; G06F 21/6218; G06F 21/604
See application file for complete search history.

(56) References Cited

U.S. PATENT DOCUMENTS

| 7,930,542 | B2 | 4/2011 | Ganesan |
| 8,112,787 | B2 | 2/2012 | Buer |
| 8,689,290 | B2 | 4/2014 | Buer |
| 8,693,695 | B2 | 4/2014 | Brown et al. |
| 2003/0050918 | A1* | 3/2003 | Pilkington et al. ............ 707/1 |
| 2007/0005779 | A1* | 1/2007 | Yao .................. H04L 63/0807 709/228 |
| 2007/0283012 | A1* | 12/2007 | Chu .................. H04L 41/022 709/225 |

(Continued)

FOREIGN PATENT DOCUMENTS

WO 2013108018 A1 7/2013

*Primary Examiner* — Chau Le
*Assistant Examiner* — Ghodrat Jamshidi
(74) *Attorney, Agent, or Firm* — Clements Bernard Walker PLLC; Lawrence A. Baratta, Jr.; Christopher L. Bernard (57) ABSTRACT

A cloud-based method, a system, and a cloud-based security system include receiving a request from a user for a cloud application at a proxy server; determining whether the user is authenticated based on a presence of cookies in the request; if the cookies are present, un-transforming the cookies by the proxy server and forwarding the request with the un-transformed cookies to the cloud application; and, if the cookies are not present, forwarding the request to the cloud application by the proxy server for authentication and transforming the cookies subsequent to the authentication prior to sending the cookies to the user.

14 Claims, 5 Drawing Sheets

(56) References Cited

U.S. PATENT DOCUMENTS

| | | | |
|---|---|---|---|
| 2011/0265155 A1* | 10/2011 | Liu | H04L 63/0815 |
| | | | 726/5 |
| 2011/0302273 A1 | 12/2011 | Pfitzmann et al. | |
| 2012/0266227 A1 | 10/2012 | Colson | |
| 2013/0007845 A1* | 1/2013 | Chang et al. | 726/4 |
| 2014/0095865 A1 | 4/2014 | Yerra et al. | |
| 2014/0101734 A1 | 4/2014 | Ronda et al. | |
| 2014/0122873 A1 | 5/2014 | Deutsch et al. | |
| 2014/0351573 A1* | 11/2014 | Martini | 713/153 |
| 2015/0215348 A1* | 7/2015 | Koeten | H04L 65/1073 |
| | | | 709/225 |

* cited by examiner

CLOUD APPLICATION CONTROL USING MAN-IN-THE-MIDDLE IDENTITY BROKERAGE

FIELD OF THE DISCLOSURE

The present disclosure relates generally to computer networking systems and methods. More particularly, the present disclosure relates to systems and methods for cloud application control using man-in-the-middle identity brokerage.

BACKGROUND OF THE DISCLOSURE

Cloud access security brokers (CASBs) are on-premises or cloud-based security policy enforcement points, placed between cloud service consumers and cloud service providers to combine and interject enterprise security policies as the cloud-based resources are accessed. For example, Zscaler (www.zscaler.com) is an exemplary CASB. CASBs act as a control point and generally offer a range of capabilities including encryption, auditing, data loss prevention (DLP), access control, and anomaly detection. CASBs consolidate multiple types of security policy enforcement. Example security policies include authentication, single sign-on, authorization, credential mapping, device profiling, encryption, tokenization, logging, alerting, malware detection/prevention, data leakage prevention, and so on. There has been an explosion in the past couple years of enterprise cloud apps used in the enterprise. These new services are run on hardware owned by the provider, removing the responsibility for IT to manage and provide the infrastructure to run an application. This does not remove the responsibility for IT to ensure the security and compliance of the company's data, however. To meet security and privacy requirements, IT needs greater visibility and control of enterprise data in the cloud that is accessed using unmanaged devices.

Current techniques have the ability to detect usage of cloud applications (e.g., salesforce.com, box.com, Office365, etc.) through a proxy server. However, these techniques do not provide granular controls on application usage and cannot force the user to access the cloud application through the proxy server. In order to provide granular controls and enforce access through a proxy server for the cloud applications, a new mechanism for authentication and authorization is necessary.

BRIEF SUMMARY OF THE DISCLOSURE

In an exemplary embodiment, a cloud-based method includes receiving a request from a user for a cloud application at a proxy server; determining whether the user is authenticated based on a presence of cookies in the request; if the cookies are present, un-transforming the cookies by the proxy server and forwarding the request with the un-transformed cookies to the cloud application; and if the cookies are not present, forwarding the request to the cloud application by the proxy server for authentication and transforming the cookies subsequent to the authentication prior to sending the cookies to the user. The proxy server can be a transparent proxy between the user and the cloud application acting as a man-in-the-middle. The cloud-based method can further include performing the authentication through identity federation mechanisms via the proxy server. The identity federation can include the proxy server. The cloud-based method can further include preventing direct access to the cloud application based on the transforming the cookies. The cloud-based method can further include monitoring data between the user and the cloud application by the proxy server for threat detection, malware preclusion, data loss prevention, and policy enforcement on the user. The proxy server can be part of a distributed security system including a Cloud access security broker. The cloud-based method can further include preventing access to the cloud application by the proxy server based on a plurality of factors. The plurality of factors can include a location of the user, an access level of the user, a device type of the user, and an application type used by the user. The cloud-based method can further include monitoring for data leakage by the user through the cloud application. The cookie transformation is done using standard crypto algorithms which are not easily compromised. Only the cloud node (CN) can un-transform the cookies. Neither the cloud application nor the user can transform the cookies.

In another exemplary embodiment, a system includes a network interface; a data store; a processor communicatively coupled to the network interface and the data store; memory storing instructions that, when executed, cause the processor to: receive a request from a user for a cloud application at a proxy server; determine whether the user is authenticated based on a presence of cookies in the request; if the cookies are present, un-transform the cookies by the proxy server and forwarding the request with the un-transformed cookies to the cloud application; and, if the cookies are not present, forward the request to the cloud application by the proxy server for authentication and transform the cookies subsequent to the authentication prior to sending the cookies to the user. The system can include a transparent proxy between the user and the cloud application acting as a man-in-the-middle. The memory storing instructions that, when executed, can further cause the processor to: forward the request to the cloud application by the proxy server for authentication through an identity federation. The identity federation can include the system. The memory storing instructions that, when executed, can further cause the processor to: prevent direct access to the cloud application based on the transformed cookies. The memory storing instructions that, when executed, can further cause the processor to: monitor data between the user and the cloud application by the proxy server for threat detection, malware preclusion, data loss prevention, and policy enforcement on the user. The system can be part of a distributed security system including a Cloud access security broker. The memory storing instructions that, when executed, can further cause the processor to: prevent access to the cloud application by the proxy server based on a plurality of factors, wherein the plurality of factors can include a location of the user, an access level of the user, a device type of the user, and an application type used by the user. The memory storing instructions that, when executed, can further cause the processor to: monitor for data leakage by the user through the cloud application.

In yet another exemplary embodiment, a cloud-based security system includes a plurality of nodes communicatively coupled to one or more users, wherein the plurality of nodes each perform inline monitoring for one of the one or more users for security as a Cloud access security broker; wherein each of the plurality of nodes is configured to: receive a request from a user for a cloud application at a proxy server; determine whether the user is authenticated based on a presence of cookies in the request; if the cookies are present, un-transform the cookies by the proxy server and forwarding the request with the un-transformed cookies to the cloud application; and, if the cookies are not present, forward the request to the cloud application by the proxy server for authentication and transform the cookies subsequent to the authentication prior to sending the cookies to the user.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1 is a network diagram of a distributed security system, and the like;

DETAILED DESCRIPTION OF THE DISCLOSURE

In various exemplary embodiments, systems and methods for cloud application control using man-in-the-middle identity brokerage are described. The systems and methods apply to cloud applications (such as Box.net, Salesforce, Office365, etc.) which support identity federation for Single Sign-on (SSO) authentication. The cloud applications are decryptable via Secure Sockets Layer (SSL) man-in-the-middle mechanisms by the proxy in question. The traffic is forwarded via the proxy at all times. Advantageously, the systems and methods provide business application controls in the cloud with transparent interception, provide access controls for applications in the cloud, prevent and detect malicious activity in cloud applications, detect and prevent data leakage via cloud applications, etc.

§1.0 Example High Level System Architecture

Figure 1:
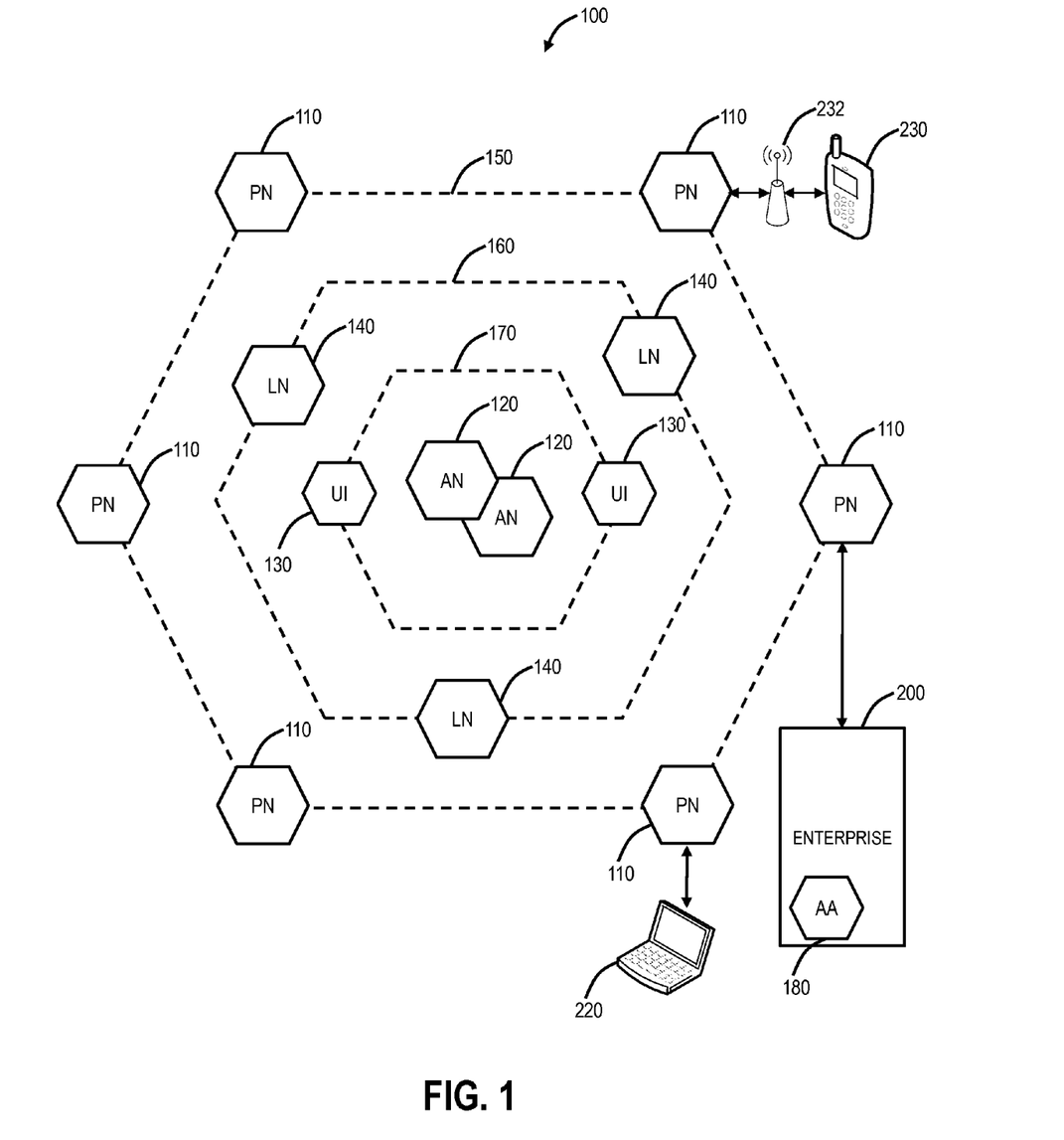

Referring to FIG. 1, in an exemplary embodiment, a block diagram illustrates a distributed security system 100. The system 100 may, for example, be implemented as an overlay network in a wide area network (WAN), such as the Internet, a local area network (LAN), or the like. The system 100 includes content processing nodes (PN) 110 (which can also be referred to as enforcement nodes (EN)), that proactively detect and preclude the distribution of security threats, e.g., malware, spyware, viruses, email spam, etc., and other undesirable content sent from or requested by an external system. The processing nodes 110 can also log activity and enforce policies. Example external systems may include an enterprise 200, a computer device 220, and a mobile device 230, or other network and computing systems communicatively coupled to the system 100. In an exemplary embodiment, each of the processing nodes 110 may include a decision system, e.g., data inspection engines that operate on a content item, e.g., a web page, a file, an email message, or some other data or data communication that is sent from or requested by one of the external systems. In an exemplary embodiment, all data destined for or received from the Internet is processed through one of the processing nodes 110. In another exemplary embodiment, specific data specified by each external system, e.g., only email, only executable files, etc., is process through one of the processing node 110.

Each of the processing nodes 110 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an exemplary embodiment, the threat classification may be reduced to a subset of categories e.g., violating, non-violating, neutral, unknown. Based on the subset classification, the processing node 110 may allow distribution of the content item, preclude distribution of the content item, allow distribution of the content item after a cleaning process, or perform threat detection on the content item. In an exemplary embodiment, the actions taken by one of the processing nodes 110 may be determinative on the threat classification of the content item and on a security policy of the external system to which the content item is being sent from or from which the content item is being requested by. A content item is violating if, for any part C=[c1, c2, . . . , cm] of the content item, at any of the processing nodes 110, any one of the data inspection engines generates an output that results in a classification of "violating."

Figure 3:
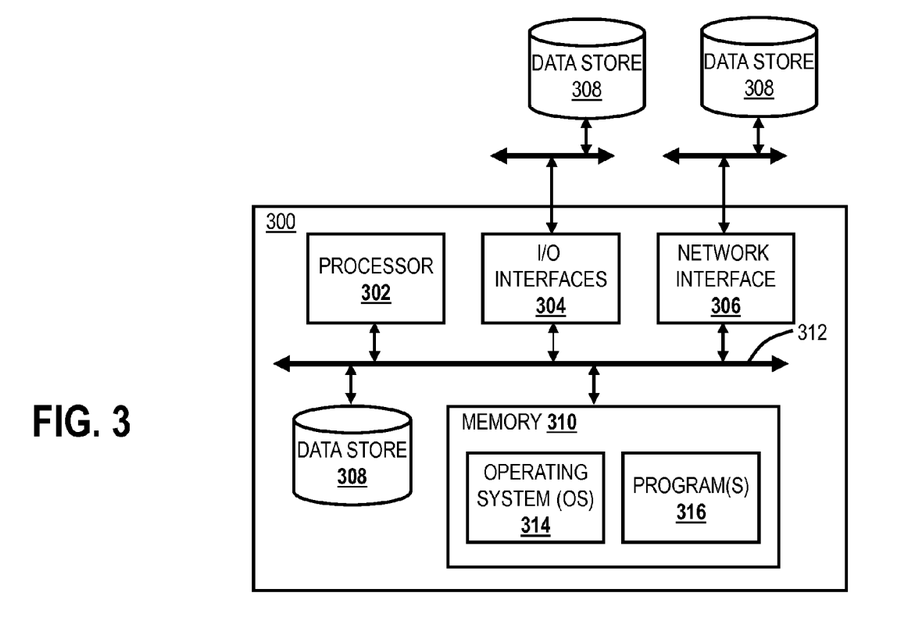
FIG. 3 is a block diagram of a server which may be used in the distributed security system of FIG. 1 or standalone.

Each of the processing nodes 110 may be implemented by one or more of computer and communication devices, e.g., server computers, gateways, switches, etc., such as the server 300 described in FIG. 3. In an exemplary embodiment, the processing nodes 110 may serve as an access layer 150. The access layer 150 may, for example, provide external system access to the security system 100. In an exemplary embodiment, each of the processing nodes 110 may include Internet gateways and one or more servers, and the processing nodes 110 may be distributed through a geographic region, e.g., throughout a country, region, campus, etc. According to a service agreement between a provider of the system 100 and an owner of an external system, the system 100 may thus provide security protection to the external system at any location throughout the geographic region.

Data communications may be monitored by the system 100 in a variety of ways, depending on the size and data requirements of the external system. For example, an enterprise 200 may have multiple routers, switches, etc. that are used to communicate over the Internet, and the routers, switches, etc. may be configured to establish communications through the nearest (in traffic communication time, for example) processing node 110. A mobile device 230 may be configured to communicated to a nearest processing node 110 through any available wireless access device, such as an access point, or a cellular gateway. A single computer device 220, such as a consumer's personal computer, may have its browser and email program configured to access the nearest processing node 110, which, in turn, serves as a proxy for the computer device 220. Alternatively, an Internet provider may have all of its customer traffic processed through the processing nodes 110.

In an exemplary embodiment, the processing nodes 110 may communicate with one or more authority nodes (AN) 120. The authority nodes 120 may store policy data for each external system and may distribute the policy data to each of the processing nodes 110. The policy may, for example, define security policies for a protected system, e.g., security policies for the enterprise 200. Example policy data may define access privileges for users, web sites and/or content that is disallowed, restricted domains, etc. The authority nodes 120 may distribute the policy data to the processing nodes 110. In an exemplary embodiment, the authority nodes 120 may also distribute threat data that includes the classifications of content items according to threat classifications, e.g., a list of known viruses, a list of known malware sites, spam email domains, a list of known phishing sites, etc. The distribution of threat data between the processing nodes 110 and the authority nodes 120 may implemented by push and pull distribution schemes described in more detail below. In an exemplary embodiment, each of the authority nodes 120 may be implemented by one or more computer and communication devices, e.g., server computers, gateways, switches, etc., such as the server 300 described in FIG. 3. In some exemplary embodiments, the authority nodes 120 may serve as an application layer 160. The application layer 160 may, for example, manage and provide policy data, threat data, and data inspection engines and dictionaries for the processing nodes 110. In an exemplary embodiment, the application layer 160 can continually update the processing nodes 110 with newly detected malware as described herein for zero day/zero hour protection.

Other application layer functions may also be provided in a data logging layer 170, such as a user interface (UI) front-end 130. The user interface front-end 130 may provide a user interface through which users of the external systems may provide and define security policies, e.g., whether email traffic is to be monitored, whether certain web sites are to be precluded, etc. Another application capability that may be provided through the user interface front-end 130 is security analysis and log reporting. The underlying data on which the security analysis and log reporting functions operate are stored in logging nodes (LN) 140, which serve as a data logging layer 170. Each of the logging nodes 140 may store data related to security operations and network traffic processed by the processing nodes 110 for each external system. In an exemplary embodiment, the logging node 140 data may be anonymized so that data identifying an enterprise is removed or obfuscated. For example, identifying data may be removed to provide an overall system summary of security processing for all enterprises and users without revealing the identity of any one account. Alternatively, identifying data may be obfuscated, e.g., provide a random account number each time it is accessed, so that an overall system summary of security processing for all enterprises and users may be broken out by accounts without revealing the identity of any one account. In another exemplary embodiment, the identifying data and/or logging node 140 data may be further encrypted, e.g., so that only the enterprise (or user if a single user account) may have access to the logging node 140 data for its account. Other processes of anonymizing, obfuscating, or securing logging node 140 data may also be used.

In an exemplary embodiment, an access agent 180 may be included in the external systems. For example, the access agent 180 is deployed in the enterprise 200. The access agent 180 may, for example, facilitate security processing by providing a hash index of files on a client device to one of the processing nodes 110, or may facilitate authentication functions with one of the processing nodes 110, e.g., by assigning tokens for passwords and sending only the tokens to a processing node so that transmission of passwords beyond the network edge of the enterprise is minimized. Other functions and processes may also be facilitated by the access agent 180. In an exemplary embodiment, the processing node 110 may act as a forward proxy that receives user requests to external servers addressed directly to the processing node 110. In another exemplary embodiment, the processing node 110 may access user requests that are passed through the processing node 110 in a transparent mode. A protected system, e.g., enterprise 200, may, for example, choose one or both of these modes. For example, a browser may be configured either manually or through the access agent 180 to access the processing node 110 in a forward proxy mode. In the forward proxy mode, all accesses are addressed to the processing node 110.

In an exemplary embodiment, an enterprise gateway may be configured so that user requests are routed through the processing node 110 by establishing a communication tunnel between enterprise gateway and the processing node 110. For establishing the tunnel, existing protocols such as generic routing encapsulation (GRE), layer two tunneling protocol (L2TP), or other Internet Protocol (IP) security protocols may be used. In another exemplary embodiment, the processing nodes 110 may be deployed at Internet service provider (ISP) nodes. The ISP nodes may redirect subject traffic to the processing nodes 110 in a transparent proxy mode. Protected systems, such as the enterprise 200, may use a multiprotocol label switching (MPLS) class of service for indicating the subject traffic that is to be redirected. For example, at the within the enterprise the access agent 180 may be configured to perform MPLS labeling. In another transparent proxy mode exemplary embodiment, a protected system, such as the enterprise 200, may identify the processing node 110 as a next hop router for communication with the external servers.

Generally, the distributed security system 100 may generally refer to an exemplary cloud-based security system. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, with no installed client version of an application required. Centralization gives cloud service providers complete control over the versions of the browser-based applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The distributed security system 100 is illustrated herein as one exemplary embodiment of a cloud-based system, and those of ordinary skill in the art will recognize the cloud based mobile device security and policy systems and methods contemplate operation on any cloud based system. In view of the foregoing, the systems and methods described herein and, for example, the distributed security system 100 can be viewed as "security as a service" allowing threat detection, malware preclusion, etc. without having native applications installed on each individual user device or user equipment.

§2.0 Example Detailed System Architecture and Operation

Figure 2:
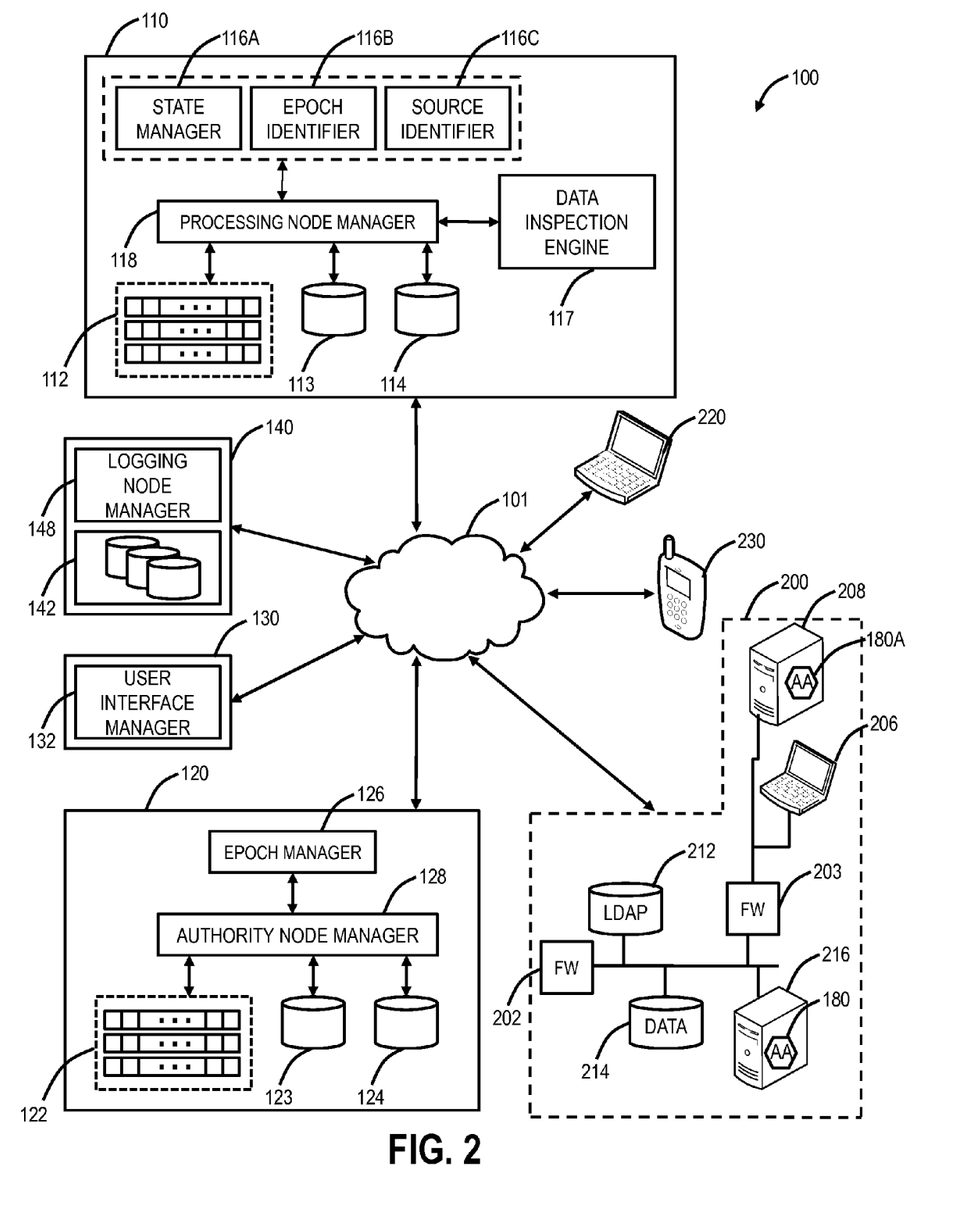
FIG. 2 is a network diagram of the distributed security system of FIG. 1 illustrating various components in more detail.

Referring to FIG. 2, in an exemplary embodiment, a block diagram illustrates various components of the distributed security system 100 in more detail. Although FIG. 2 illustrates only one representative component processing node 110, authority node 120 and logging node 140, those of ordinary skill in the art will appreciate there may be many of each of the component nodes 110, 120 and 140 present in the system 100. A wide area network (WAN) 101, such as the Internet, or some other combination of wired and/or wireless networks, communicatively couples the processing node 110, the authority node 120, and the logging node 140 therebetween. The external systems 200, 220 and 230 likewise communicate over the WAN 101 with each other or other data providers and publishers. Some or all of the data communication of each of the external systems 200, 220 and 230 may be processed through the processing node 110.

FIG. 2 also shows the enterprise 200 in more detail. The enterprise 200 may, for example, include a firewall (FW) 202 protecting an internal network that may include one or more enterprise servers 216, a lightweight directory access protocol (LDAP) server 212, and other data or data stores 214. Another firewall 203 may protect an enterprise subnet that can include user computers 206 and 208 (e.g., laptop and desktop computers). The enterprise 200 may communicate with the WAN 101 through one or more network devices, such as a router, gateway, switch, etc. The LDAP server 212 may store, for example, user login credentials for registered users of the enterprise 200 system. Such credentials may include a user identifiers, login passwords, and a login history associated with each user identifier. The other data stores 214 may include sensitive information, such as bank records, medical records, trade secret information, or any other information warranting protection by one or more security measures.

In an exemplary embodiment, a client access agent 180a may be included on a client computer 208. The client access agent 180a may, for example, facilitate security processing by providing a hash index of files on the user computer 208 to a processing node 110 for malware, virus detection, etc. Other security operations may also be facilitated by the access agent 180a. In another exemplary embodiment, a server access agent 180 may facilitate authentication functions with the processing node 110, e.g., by assigning tokens for passwords and sending only the tokens to the processing node 110 so that transmission of passwords beyond the network edge of the enterprise 200 is minimized. Other functions and processes may also be facilitated by the server access agent 180b. The computer device 220 and the mobile device 230 may also store information warranting security measures, such as personal bank records, medical information, and login information, e.g., login information to the server 206 of the enterprise 200, or to some other secured data provider server. The computer device 220 and the mobile device 230 can also store information warranting security measures, such as personal bank records, medical information, and login information, e.g., login information to a server 216 of the enterprise 200, or to some other secured data provider server.

§2.1 Example Processing Node Architecture

In an exemplary embodiment, the processing nodes 110 are external to network edges of the external systems 200, 220 and 230. Each of the processing nodes 110 stores security policy data 113 received from the authority node 120 and monitors content items requested by or sent from the external systems 200, 220 and 230. In an exemplary embodiment, each of the processing nodes 110 may also store a detection process filter 112 and/or threat data 114 to facilitate the decision of whether a content item should be processed for threat detection. A processing node manager 118 may manage each content item in accordance with the security policy data 113, and the detection process filter 112 and/or threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item may be allowed, precluded, or threat detected. In general, content items that are already classified as "clean" or not posing a threat can be allowed, while those classified as "violating" may be precluded. Those content items having an unknown status, e.g., content items that have not been processed by the system 100, may be threat detected to classify the content item according to threat classifications.

The processing node 110 may include a state manager 116A. The state manager 116A may be used to maintain the authentication and the authorization states of users that submit requests to the processing node 110. Maintenance of the states through the state manager 116A may minimize the number of authentication and authorization transactions that are necessary to process a request. The processing node 110 may also include an epoch processor 116B. The epoch processor 116B may be used to analyze authentication data that originated at the authority node 120. The epoch processor 116B may use an epoch ID to further validate the authenticity of authentication data. The processing node 110 may further include a source processor 116C. The source processor 116C may be used to verify the source of authorization and authentication data. The source processor 116C may identify improperly obtained authorization and authentication data, enhancing the security of the network. Collectively, the state manager 116A, the epoch processor 116B, and the source processor 116C operate as data inspection engines.

Because the amount of data being processed by the processing nodes 110 may be substantial, the detection processing filter 112 may be used as the first stage of an information lookup procedure. For example, the detection processing filter 112 may be used as a front end to a looking of the threat data 114. Content items may be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence. Each content item may have an information key that is hashed. For example, the processing node manager 118 may identify the Uniform Resource Locator (URL) address of URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 may improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 thus improves performance of queries where the answer to a request for information is usually positive. Such instances may include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information. In an exemplary embodiment, the detection processing filter 112 may be a Bloom filter implemented by a single hash function. The Bloom filter may be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

§2.2 Example Authority Node Architecture

In general, the authority node 120 includes a data store that stores master security policy data 123 for each of the external systems 200, 220 and 230. An authority node manager 128 may be used to manage the master security policy data 123, e.g., receive input from users of each of the external systems defining different security policies, and may distribute the master security policy data 123 to each of the processing nodes 110. The processing nodes 110 then store a local copy of the security policy data 113. The authority node 120 may also store a master detection process filter 122. The detection processing filter 122 may include data indicating whether content items have been processed by one or more of the data inspection engines 116 in any of the processing nodes 110. The authority node manager 128 may be used to manage the master detection processing filter 122, e.g., receive updates from a processing nodes 110 when the processing node 110 has processed a content item and update the master detection processing filter 122. For example, the master detection processing filter 122 may be distributed to the processing nodes 110, which then store a local copy of the detection processing filter 112.

In an exemplary embodiment, the authority node 120 may include an epoch manager 126. The epoch manager 126 may be used to generate authentication data associated with an epoch ID. The epoch ID of the authentication data is a verifiable attribute of the authentication data that can be used to identify fraudulently created authentication data. In an exemplary embodiment, the detection processing filter 122 may be a guard table. The processing node 110 may, for example, use the information in the local detection processing filter 112 to quickly determine the presence and/or absence of information, e.g., whether a particular URL has been checked for malware; whether a particular executable has been virus scanned, etc. The authority node 120 may also store master threat data 124. The master threat data 124 may classify content items by threat classifications, e.g., a list of known viruses, a list of known malware sites, spam email domains, list of known or detected phishing sites, etc. The authority node manager 128 may be used to manage the master threat data 124, e.g., receive updates from the processing nodes 110 when one of the processing nodes 110 has processed a content item and update the master threat data 124 with any pertinent results. In some implementations, the master threat data 124 may be distributed to the processing nodes 110, which then store a local copy of the threat data 114. In another exemplary embodiment, the authority node 120 may also monitor the health of each of the processing nodes 110, e.g., the resource availability in each of the processing nodes 110, detection of link failures, etc. Based on the observed health of each of the processing nodes 110, the authority node 120 may redirect traffic among the processing nodes 110 and/or balance traffic among the processing nodes 110. Other remedial actions and processes may also be facilitated by the authority node 120.

§2.3 Example Processing Node and Authority Node Communications

The processing node 110 and the authority node 120 may be configured according to one or more push and pull processes to manage content items according to security policy data 113 and/or 123, detection process filters 112 and/or 122, and the threat data 114 and/or 124. In a threat data push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data 114, then the processing node manager 118 may cause one or more of the data inspection engines 117 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120.

The authority node manager 128, in response to receiving the threat data update, updates the master threat data 124 stored in the authority node data store according to the threat data update received from the processing node 110. In an exemplary embodiment, the authority node manager 128 may automatically transmit the updated threat data to the other processing nodes 110. Accordingly, threat data for new threats as the new threats are encountered are automatically distributed to each processing node 110. Upon receiving the new threat data from the authority node 120, each of processing node managers 118 may store the updated threat data in the locally stored threat data 114.

In a threat data pull and push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data, then the processing node manager 118 may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data store. If responsive threat data is stored in the master threat data 124, then the authority node manager 128 provide a reply that includes the responsive threat data to the processing node 110 so that the processing node manager 118 may manage the content item in accordance with the security policy data 113 and the classification of the content item. Conversely, if the authority node manager 128 determines that responsive threat data is not stored in the master threat data 124, then the authority node manager 128 may provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests related to responsive threat data for the content item from other processing nodes 110 can be readily served with responsive threat data.

In a detection process filter and threat data push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 may be implemented to ensure that a false positive has not occurred. The initial check of the detection process filter 112, however, may eliminate many null queries to the threat data 114, which, in turn, conserves system resources and increases efficiency. If the content item is classified by the threat data 114, then the processing node manager 118 may manage the content item in accordance with the security policy data 113 and the classification of the content item. Conversely, if the processing node manager 118 determines that the content item is not classified by the threat data 114, or if the processing node manager 118 initially determines through the detection process filter 112 that the content item is not classified by the threat data 114, then the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to one of the authority nodes 120.

The authority node manager 128, in turn, may update the master threat data 124 and the master detection process filter 122 stored in the authority node data store according to the threat data update received from the processing node 110. In an exemplary embodiment, the authority node manager 128 may automatically transmit the updated threat data and detection processing filter to other processing nodes 110. Accordingly, threat data and the detection processing filter for new threats as the new threats are encountered are automatically distributed to each processing node 110, and each processing node 110 may update its local copy of the detection processing filter 112 and threat data 114.

In a detection process filter and threat data pull and push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 can be implemented to ensure that a false positive has not occurred. The initial check of the detection process filter 112, however, may eliminate many null queries to the threat data 114, which, in turn, conserves system resources and increases efficiency. If the processing node manager 118 determines that the content item has not been processed, it may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node 120 data store. If responsive threat data is stored in the master threat data 124, then the authority node manager 128 provides a reply that includes the responsive threat data to the processing node 110 so that the processing node manager 118 can manage the content item in accordance with the security policy data 113 and the classification of the content item, and further update the local detection processing filter 112. Conversely, if the authority node manager 128 determines that responsive threat data is not stored in the master threat data 124, then the authority node manager 128 may provide a reply that does not include the responsive threat data to the processing node 110. In response, the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 may then update the master threat data 124. Thereafter, any future requests for related to responsive threat data for the content item from other processing nodes 110 can be readily served with responsive threat data.

The various push and pull data exchange processes provided above are exemplary processes for which the threat data and/or detection process filters may be updated in the system 100 of FIGS. 1 and 2. Other update processes, however, are contemplated with the present invention. The data inspection engines 116, processing node manager 118, authority node manager 128, user interface manager 132, logging node manager 148, and access agent 180 may be realized by instructions that upon execution cause one or more processing devices to carry out the processes and functions described above. Such instructions can, for example, include interpreted instructions, such as script instructions, e.g., JavaScript or ECMAScript instructions, or executable code, or other instructions stored in a non-transitory computer readable medium. Other processing architectures can also be used, e.g., a combination of specially designed hardware and software, for example.

§3.0 Exemplary Server Architecture

Referring to FIG. 3, in an exemplary embodiment, a block diagram illustrates a server 300 which may be used in the system 100, in other systems, or standalone. Any of the processing nodes 110, the authority nodes 120, and the logging nodes 140 may be formed through one or more servers 300. Further, the computer device 220, the mobile device 230, the servers 208, 216, etc. may include the server 300 or a similar structure. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the WAN 101, the enterprise 200, and the like, etc. The network interface 306 may include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

§4.0 Exemplary Mobile Device Architecture

Figure 4:
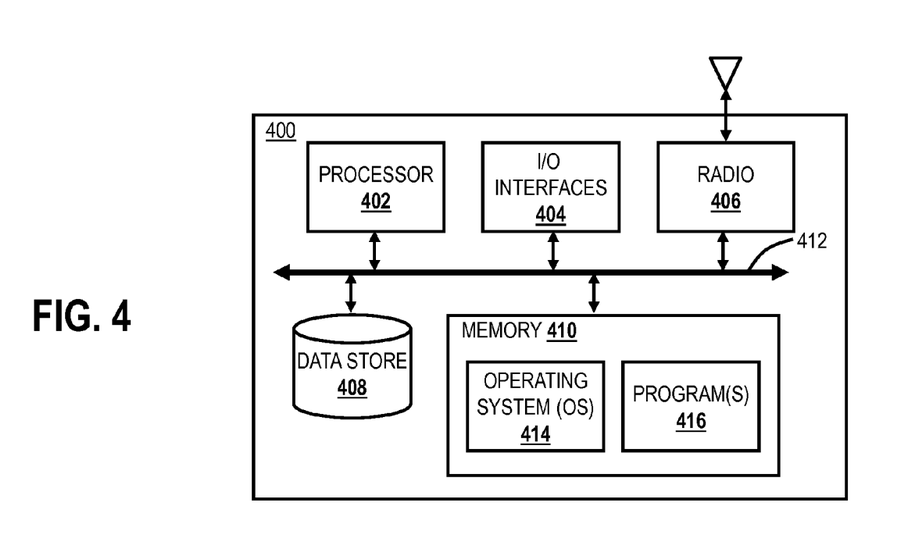
FIG. 4 is a block diagram of a mobile device which may be used in the system of FIG. 1 or with any other cloud-based system.

Referring to FIG. 4, in an exemplary embodiment, a block diagram illustrates a mobile device 400, which may be used in the system 100 or the like. The mobile device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 4 depicts the mobile device 400 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the mobile device 400, a semiconductor-based microprocessor (in the form of a microchip or chip set), or generally any device for executing software instructions. When the mobile device 400 is in operation, the processor 402 is configured to execute software stored within the memory 410, to communicate data to and from the memory 410, and to generally control operations of the mobile device 400 pursuant to the software instructions. In an exemplary embodiment, the processor 402 may include a mobile optimized processor such as optimized for power consumption and mobile applications. The I/O interfaces 404 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 may include a graphical user interface (GUI) that enables a user to interact with the mobile device 400. Additionally, the I/O interfaces 404 may further include an imaging device, i.e. camera, video camera, etc.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 4, the software in the memory 410 includes a suitable operating system (O/S) 414 and programs 416. The operating system 414 essentially controls the execution of other computer programs, and provides scheduling, input-output control, file and data management, memory management, and communication control and related services. The programs 416 may include various applications, add-ons, etc. configured to provide end user functionality with the mobile device 400. For example, exemplary programs 416 may include, but not limited to, a web browser, social networking applications, streaming media applications, games, mapping and location applications, electronic mail applications, financial applications, and the like. In a typical example, the end user typically uses one or more of the programs 416 along with a network such as the system 100.

§5.0 Exemplary General Cloud System

Figure 5:
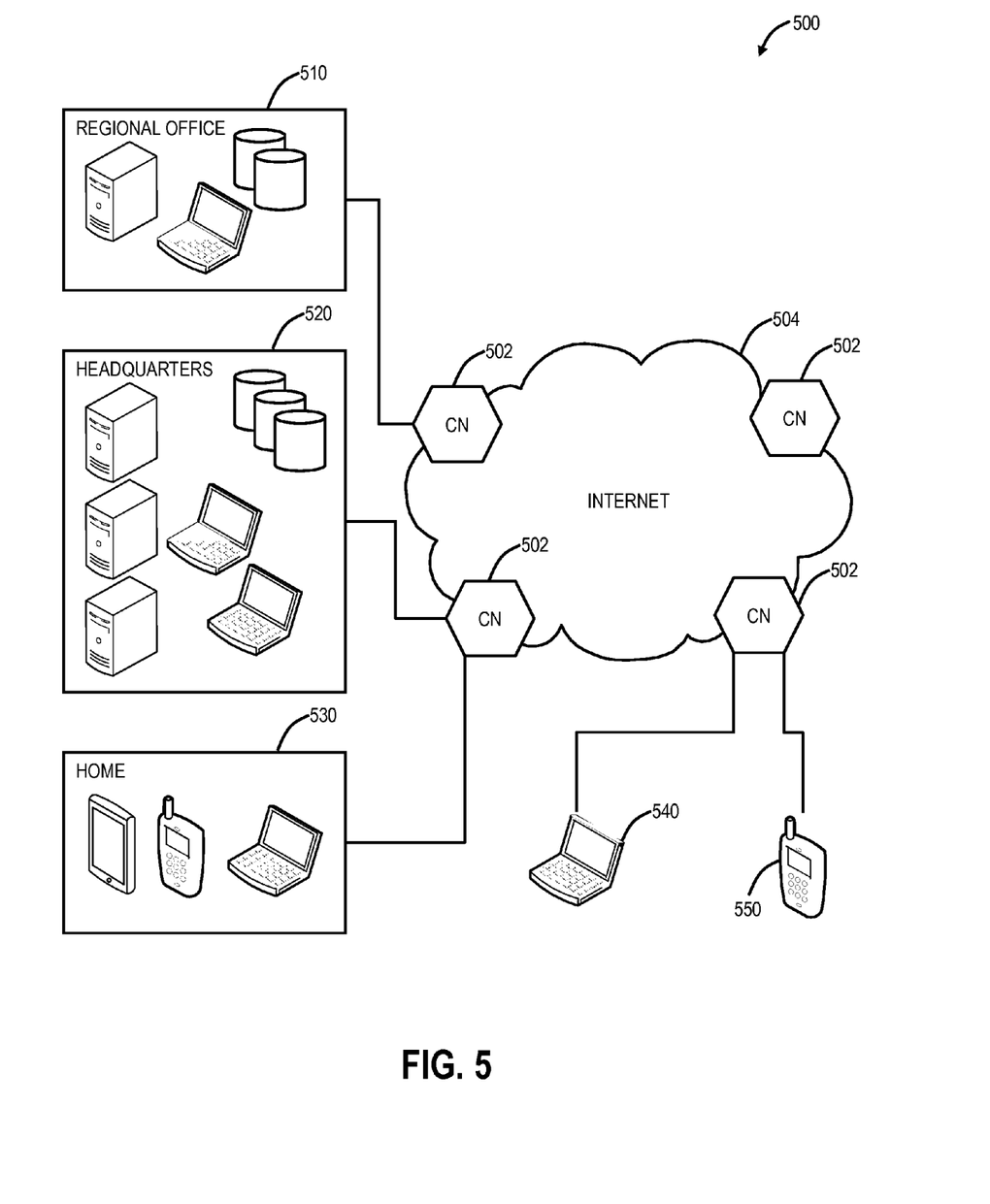
FIG. 5 is a network diagram of a cloud system.

Referring to FIG. 5, in an exemplary embodiment, a cloud system 500 is illustrated for the systems and methods for dynamic cloud-based malware behavior analysis. The cloud system 500 includes one or more cloud nodes (CN) 502 communicatively coupled to the Internet 504. The cloud nodes 502 may include the processing nodes 110, the server 300, enforcement nodes, or the like. That is, the cloud system 500 may include the distributed security system 100 or another implementation of a cloud based system. In the cloud system 500, traffic from various locations (and various devices located therein) such as a regional office 510, headquarters 520, various employee's homes 530, mobile laptop 540, and mobile device 550 is redirected to the cloud system 500 through the cloud nodes 502. That is, each of the locations 510, 520, 530, 540, 550 is communicatively coupled to the Internet 504 through the cloud nodes 502. The cloud system 500 may be configured to perform various functions such as spam filtering, uniform resource locator (URL) filtering, antivirus protection, bandwidth control, data loss prevention, zero day vulnerability protection, web 2.0 features, malware detection and blocking, and the like. In an exemplary embodiment, the cloud system 500 and the distributed security system 100 may be viewed as Security-as-a-Service through the cloud.

In an exemplary embodiment, the cloud system 500 can be configured to provide mobile device security and policy systems and methods as well as fixed device security. The mobile device 550 may be the mobile device 400, and may include common devices such as smartphones, tablets, netbooks, personal digital assistants, MP3 players, cell phones, e-book readers, and the like. The cloud system 500 is configured to provide security and policy enforcement for devices including the mobile devices 550 in the cloud. Advantageously, the cloud system 500 avoids platform specific security apps on the mobile devices 550, forwards web traffic through the cloud system 500, enables network administrators to define policies in the cloud, and enforces/cleans traffic in the cloud prior to delivery to the mobile devices 550. Further, through the cloud system 500, network administrators may define user centric policies tied to users, not devices, with the policies being applied regardless of the device used by the user. The cloud system 500 provides 24×7 security with no need for updates as the cloud system 500 is always up-to-date with current threats and without requiring device signature updates. Also, the cloud system 500 enables multiple enforcement points, centralized provisioning and logging, automatic traffic routing to a nearest cloud node 502, geographical distribution of the cloud nodes 502, policy shadowing of users which is dynamically available at the cloud nodes, etc. It is expected that the cloud nodes 502, the processing nodes 110, and/or some other cloud-based device is continually monitoring user activity for security including detection and preclusion of malware on the user's device. Also, the cloud system 500 is monitoring a large number of users concurrently.

§6.0 Cloud Applications using SSO functionality

Most cloud applications support a single sign-on (SSO) functionality and it has become the de-facto standard for authentication with corporate identity services. The processing nodes 110 and the cloud nodes 502 can be viewed as cloud-based proxy servers which can leverage the SSO functionality to authenticate and authorize users to access the cloud applications. Identity federation links a user's electronic identity and attributes across multiple distinct identity management systems. For SSO, a user's single authentication ticket, or token, is trusted across multiple IT systems or organizations. Techniques used for federated logon include SAML (Security Assertion Markup Language), OAuth, and OpenID as well as proprietary standards.

The systems and methods solve the problem of authentication and authorization to cloud applications using the SSO functionality. There are various use cases such as:

Use case 1: Corporate cloud application account (salesforce.com, box.com, etc.) could only be accessed through the cloud proxy;

Use case 2: Access to personal cloud application accounts could be restricted from an enterprise location;

Use case 3: Read-only controls are always enforced for certain employees while using corporate cloud application accounts;

Use case 4: Access to non-business and consumer cloud apps is always restricted while on a corporate network;

Use case 5: Solution shall work for mobile devices, desktop apps and browser based web apps.

Figure 6:
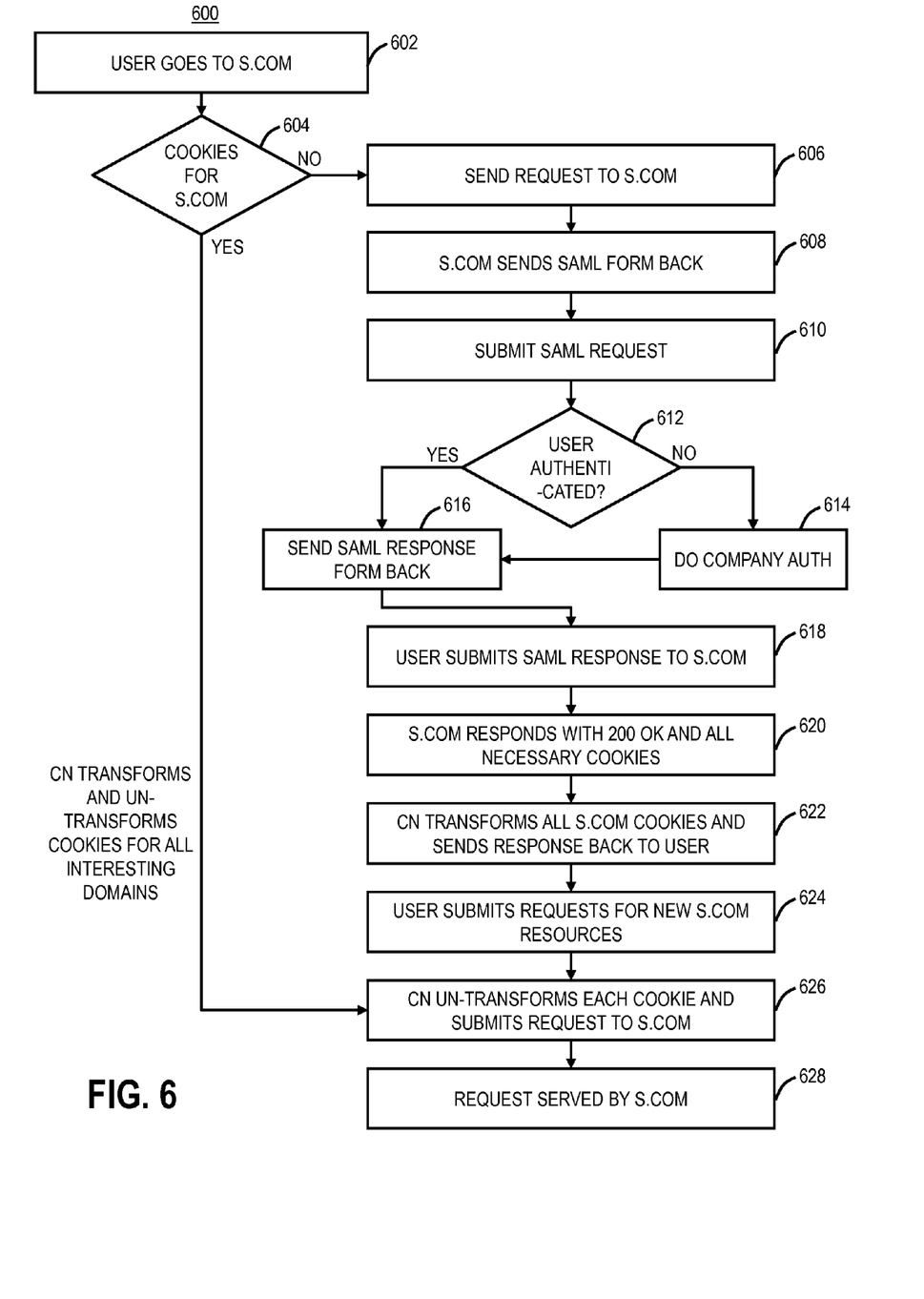
FIG. 6 is a flowchart illustrates a cloud method for authentication and authorization in cloud applications using the Single Sign-on (SSO) functionality.

Referring to FIG. 6, in an exemplary embodiment, a flowchart illustrates a cloud method 600 for authentication and authorization in cloud applications using the SSO functionality. The cloud method 600 contemplates operation with cloud applications supporting identity federation for SSO. With the cloud method 600, the processing node 110, the cloud node, etc. (collectively a proxy) can decrypt cloud applications via SSL man-in-the-middle mechanisms, and all traffic is run through the proxy. In this manner, a CASB can monitor cloud application usage. Prior to implementation of the cloud method 600, a user is connected to a cloud proxy, e.g., the processing node 110, the cloud node 502, etc. The user accesses a cloud application through the proxy server (step 602). For example, the cloud application is s.com for illustration purposes, but can include any cloud application supporting SSO functionality.

Based on the presence of cookies, the proxy decides if the user is authenticated (step 604). If the user does not have cookies, a request is sent to the cloud application (step 606). If the user is not authenticated, the proxy forwards the user's request to the cloud application. A typical behavior is for the cloud application to request authentication. Using the identity federation, the cloud application re-directs the user to a cloud IDP (Identity provider) proxy, which is the proxy server in question. As part of SSO protocol, the proxy authenticates the user, using this organization's authentication mechanism. The cloud application sends a SAML form back to the user (step 608), and the user submits a SAML request (step 610). For example, the SAML request could be submitted to login.zscaler.net/idp_sso/company.com. The cloud method 600 determines if the user is authenticated (step 612), and if not, the cloud method 600 includes company authentication (step 614). Subsequent to the company authentication and if the user is authenticated (step 612), the cloud method 600 sends the SAML response form back (step 616). Specifically, if the user is coming from an enterprise location that does not require authentication, a cookie from the proxy will not be present, and in this case, the cloud method 600 will need to authenticate the user with the associated company authentication mechanisms.

The user submits the SAML response to the cloud application (step 618), and the cloud application responds with responds with all necessary cookies (step 620). A cookie, also known as an HTTP cookie, web cookie, or browser cookie, is a small piece of data sent from a website and stored in a user's web browser while the user is browsing that website. Every time the user loads the website, the browser sends the cookie back to the server to notify the website of the user's previous activity. Authentication cookies are the most common method used by web servers to know whether the user is logged in or not, and which account they are logged in with. Without such a mechanism, the site would not know whether to send a page containing sensitive information, or require the user to authenticate themselves by logging in. The security of an authentication cookie generally depends on the security of the issuing website and the user's web browser, and on whether the cookie data is encrypted. The cookie transformation is done using standard crypto algorithms which are not easily compromised. Only the cloud node (CN) can un-transform the cookies. Neither the cloud application nor the user can transform the cookies.

Note, the foregoing steps are performed by the user and the authentication service through the proxy (e.g., the CASB—the processing node 110, the cloud node 502, etc.). Once the user is authenticated, the user is redirected back to the cloud application with the user's identity established via the identity federation protocol (like SAML, WS-Fed, etc.). On successful authentication, the cloud application responds back with user's cookies for access. The cloud method 600 includes a cloud node (CN) receiving the necessary cookies from the step 620 and transforming the cookies and sending the response back to the user (step 622). The cloud based proxy server transforms the cloud application cookies and sends back the response to the user. Here, the proxy is acting in the middle and transforming the cookies such that the user can only access the cloud application through the proxy. Note that if a cloud application control is enforced, then the cloud node (CN) will place a special cookie for these applications to distinguish them.

Subsequent user requests to the same cloud application will contain the transformed cookies to the proxy (step 624 and if there are cookies in step 604), which un-transforms it to the original cookies and sends the request to the cloud application (step 626). Direct access to the cloud application will be prevented because of the transformed cookies. Furthermore, the cloud application will re-direct back to cloud proxy for authentication again of cookies are not present. So unauthorized access without going through proxy server is not permitted. Finally, the request is served by the cloud application (step 628) and the proxy has access to the data acting as the man-in-the-middle. Here, the proxy can monitor, protect, enforce policy, etc. At the step 604, the proxy looks for a special cookie indicating the man-in-the-middle for cloud application. Here, the proxy un-transforms the cookies. Identification of CASB cloud application domains can be done via destination Internet Protocol (IP) addresses or domains as published by the applications.

The normal flow, without the proxy, is SSL between the user and the cloud application. Here, the flow is SSL between the user and the proxy, and SSL between the proxy and the cloud application with the proxy transforming the cookies in between. The systems and methods described herein enable a transparent proxy approach to CASB monitoring of cloud applications. This is in contrast to traditional reverse proxy or alias approaches.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A cloud-based method, comprising:
   receiving a request from a user for a cloud application at a proxy server located in a distributed security system which is in an external network from the user and an external network from the cloud application, wherein the distributed security system is located between the user and the cloud application;
   determining whether the user is authenticated based on a presence of cookies in the request;
   if the cookies are present, un-transforming the cookies by the proxy server and forwarding the request with the un-transformed cookies to the cloud application; and
   if the cookies are not present, forwarding the request to the cloud application by the proxy server for authentication and transforming the cookies subsequent to the authentication prior to sending the cookies to the user;
   monitoring for data leakage, for policy compliance, and for security threats between the user and the cloud application through the distributed security system; and
   preventing direct access to the cloud application except through the distributed security system based on the transforming the cookies, wherein the cookies are only accessible through the distributed security system and wherein communication between the user and the distributed security system is secure separate from the cookies.

2. The cloud-based method of claim 1, wherein the proxy server is a transparent proxy between the user and the cloud application acting as a man-in-the-middle.

3. The cloud-based method of claim 1, further comprising:
   performing the authentication through identity federation mechanisms via the proxy server.

4. The cloud-based method of claim 3, wherein the identity federation comprises the proxy server.

5. The cloud-based method of claim 1, wherein the proxy server is part of the distributed security system comprising a Cloud access security broker, and wherein the transforming the cookies is done via crypto algorithms such that the cloud application or the user cannot un-transform the cookies.

6. The cloud-based method of claim 1, further comprising:
   preventing access to the cloud application by the proxy server based on a plurality of factors.

7. The cloud-based method of claim 6, wherein the plurality of factors comprise a location of the user, an access level of the user, a device type of the user, and an application type used by the user.

8. A system comprising a proxy server, comprising:
   a network interface;
   a data store;
   a processor communicatively coupled to the network interface and the data store;
   memory storing instructions that, when executed, cause the processor to:
      receive a request from a user for a cloud application at the proxy server located in a distributed security system which is in an external network from the user and an external network from the cloud application, wherein the distributed security system is located between the user and the cloud application;
      determine whether the user is authenticated based on a presence of cookies in the request;
      if the cookies are present, un-transform the cookies by the proxy server and forwarding the request with the un-transformed cookies to the cloud application;
      monitor for data leakage, for policy compliance, and for security threats between the user and the cloud application through the distributed security system;
      if the cookies are not present, forward the request to the cloud application by the proxy server for authentication and transform the cookies subsequent to the authentication prior to sending the cookies to the user; and
      prevent direct access to the cloud application except through the distributed security system based on the transformed cookies, wherein the cookies are only accessible through the distributed security system and wherein communication between the user and the distributed security system is secure separate from the cookies.

9. The system of claim 8, wherein the system comprise a transparent proxy between the user and the cloud application acting as a man-in-the-middle.

10. The system of claim 8, wherein the memory storing instructions that, when executed, further cause the processor to:

forward the request to the cloud application by the proxy server for authentication through an identity federation.

11. The system of claim 10, wherein the identity federation comprises the system.

12. The system of claim 8, wherein the system is part of the distributed security system comprising a Cloud access security broker.

13. The system of claim 8, wherein the memory storing instructions that, when executed, further cause the processor to:
prevent access to the cloud application by the proxy server based on a plurality of factors, wherein the plurality of factors comprise a location of the user, an access level of the user, a device type of the user, and an application type used by the user, and wherein transforming the cookies is done via crypto algorithms such that the cloud application or the use cannot un-transform the cookies.

14. A cloud-based security system, comprising:
a plurality of nodes communicatively coupled to one or more users, wherein the plurality of nodes each perform inline monitoring for one of the one or more users for security as a Cloud access security broker, and wherein each of the plurality of nodes is located in an external network from the user and an external network from a cloud application, wherein the plurality of nodes are located between the user and the cloud application;
wherein each of the plurality of nodes is configured to:
receive a request from a user for cloud application;
determine whether the user is authenticated based on a presence of cookies in the request;
if the cookies are present, un-transform the cookies by the proxy server and forwarding the request with the un-transformed cookies to the cloud application;
if the cookies are not present, forward the request to the cloud application by the proxy server for authentication and transform the cookies subsequent to the authentication prior to sending the cookies to the user;
monitor for data leakage, for policy compliance, and for security threats between the user and the cloud application through the distributed security system; and
prevent direct access to the cloud application except through the plurality of nodes based on the transformed cookies, wherein the cookies are only accessible through the plurality of nodes and wherein communication between the user and the plurality of nodes is secure separate from the cookies.

* * * * *